US008396678B2

(12) United States Patent
Davis

(10) Patent No.: US 8,396,678 B2
(45) Date of Patent: Mar. 12, 2013

(54) PEAKPOWER ENERGY MANAGEMENT AND CONTROL SYSTEM METHOD AND APPARATUS

(75) Inventor: Edward Davis, Portland, OR (US)

(73) Assignee: Edward L. Davis, Portland, OR (US)

( * ) Notice: Subject to any disclaimer, the term of this patent is extended or adjusted under 35 U.S.C. 154(b) by 507 days.

(21) Appl. No.: 12/538,767

(22) Filed: Aug. 10, 2009

(65) Prior Publication Data

US 2010/0033277 A1 Feb. 11, 2010

Related U.S. Application Data

(60) Provisional application No. 61/087,963, filed on Aug. 11, 2008, provisional application No. 61/142,838, filed on Jan. 6, 2009.

(51) Int. Cl.
*G01R 21/06* (2006.01)
*G06F 11/00* (2006.01)
(52) U.S. Cl. ........... 702/61; 702/179; 702/182; 702/185
(58) Field of Classification Search .................... 702/61, 702/62, 179, 182, 185
See application file for complete search history.

(56) References Cited

U.S. PATENT DOCUMENTS

| 7,966,150 B2 * | 6/2011 | Smith et al. .................... 702/182 |
| 2002/0095269 A1 * | 7/2002 | Natalini et al. ............... 702/188 |
| 2006/0053324 A1 * | 3/2006 | Giat et al. ..................... 713/300 |
| 2008/0177423 A1 * | 7/2008 | Brickfield et al. ............ 700/291 |
| 2009/0173839 A1 * | 7/2009 | Groeneweg et al. ........... 246/15 |
| 2009/0240449 A1 * | 9/2009 | Gibala et al. .................... 702/62 |

\* cited by examiner

*Primary Examiner* — Phuong Huynh
(74) *Attorney, Agent, or Firm* — Blakely, Sokoloff, Taylor & Zafman

(57) ABSTRACT

An integrated Energy Management and/or Control System method and apparatus that continually monitors power consumption on each piece of equipment 24/7 and performs detailed analyses of energy consumption curves including derivatives and compares data to historical data on the same equipment as well as going online and acquiring manufacturers specs and comparing to that as well as the same model number equipment in the same or other locations, in order to detect anomalies, abnormal energy consumption or provide early warning of equipment failures.

20 Claims, 15 Drawing Sheets

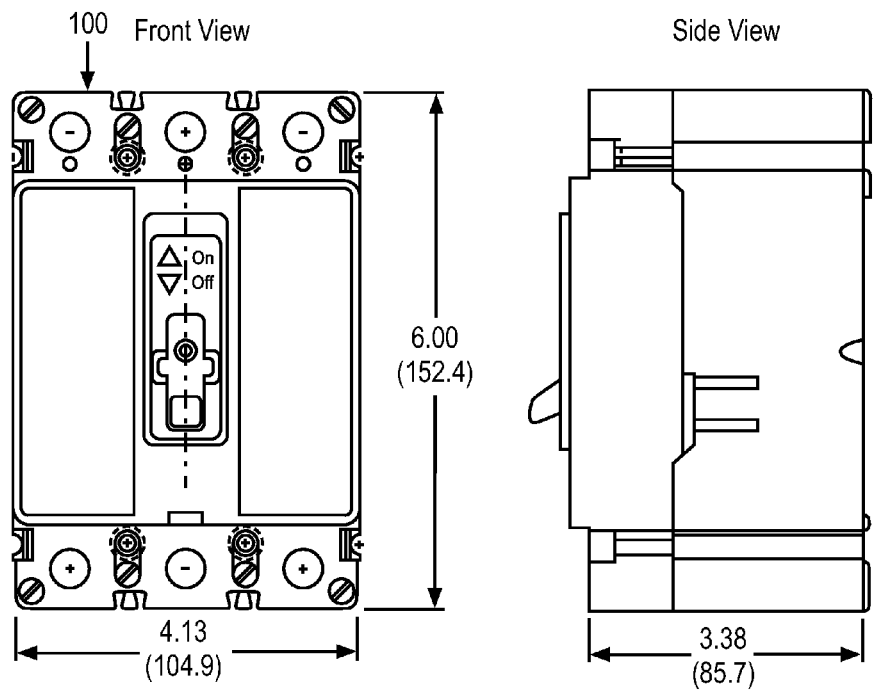
FIG. 1a  Prior Art    Circuit Breaker
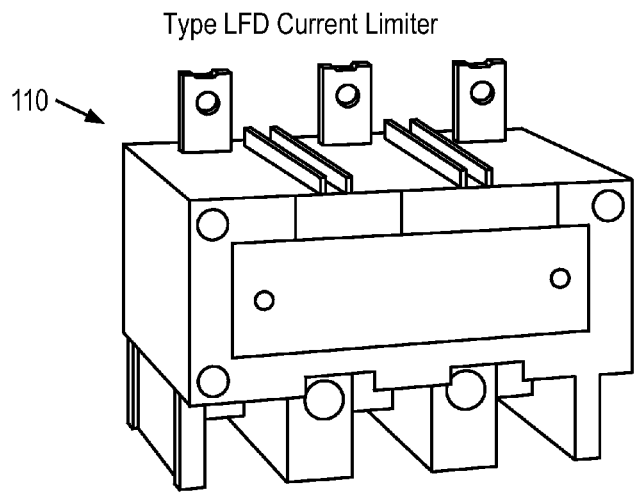
FIG. 1b  Prior Art   LFD Current Limiter

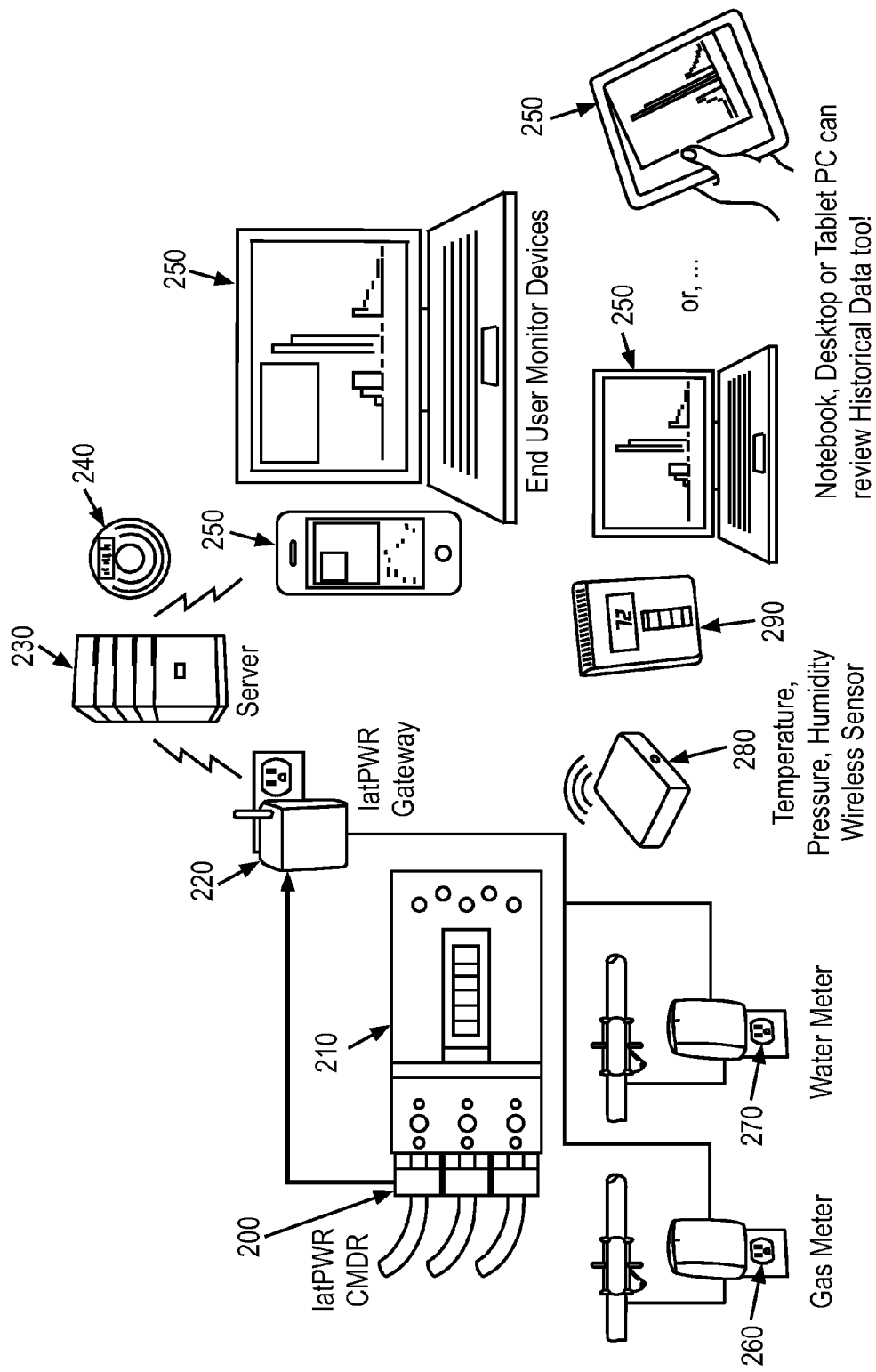
FIG. 2 The PeakPower System Components

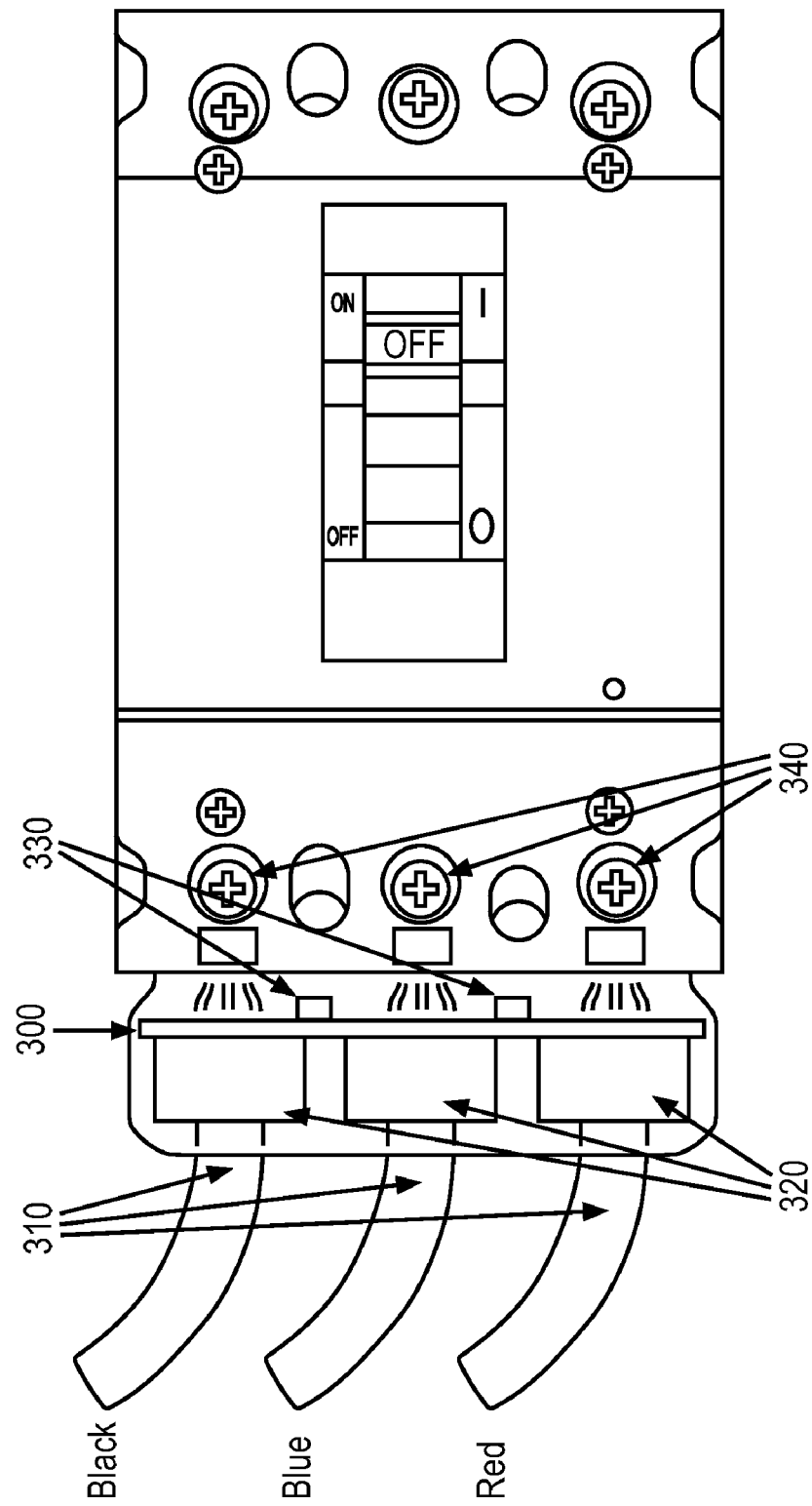

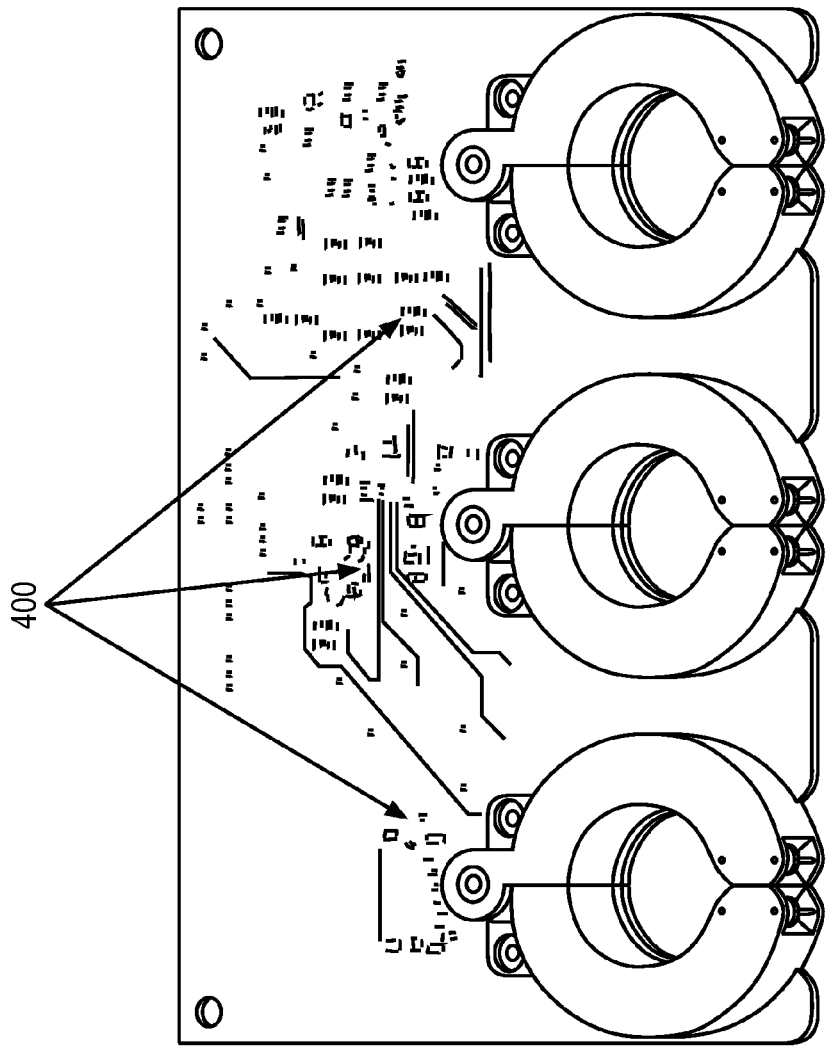
FIG. 4  The PeakPower Commander

500: Current Transformer (CT)

600: CT

700: CTs may be switched

800: CTs may be switched

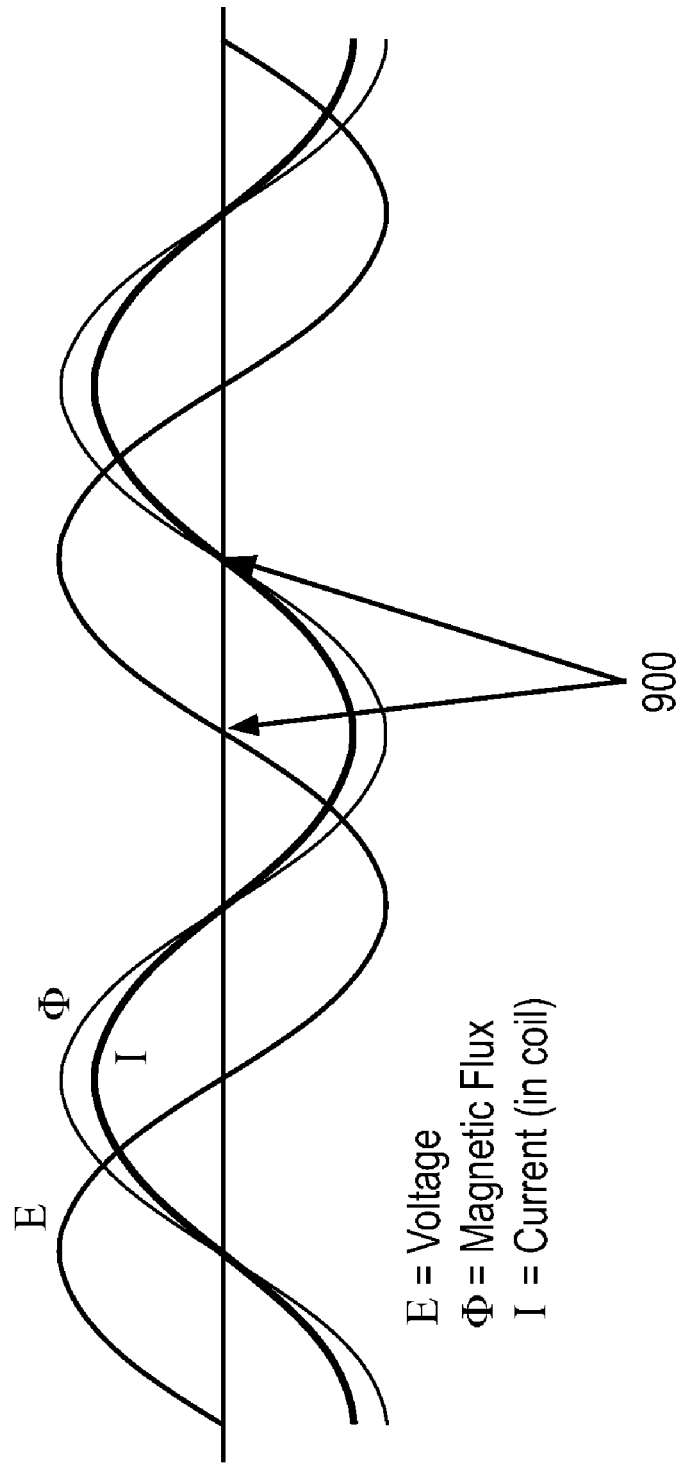
FIG. 9  Voltage Zero Crossings versus Current Zero Crossings

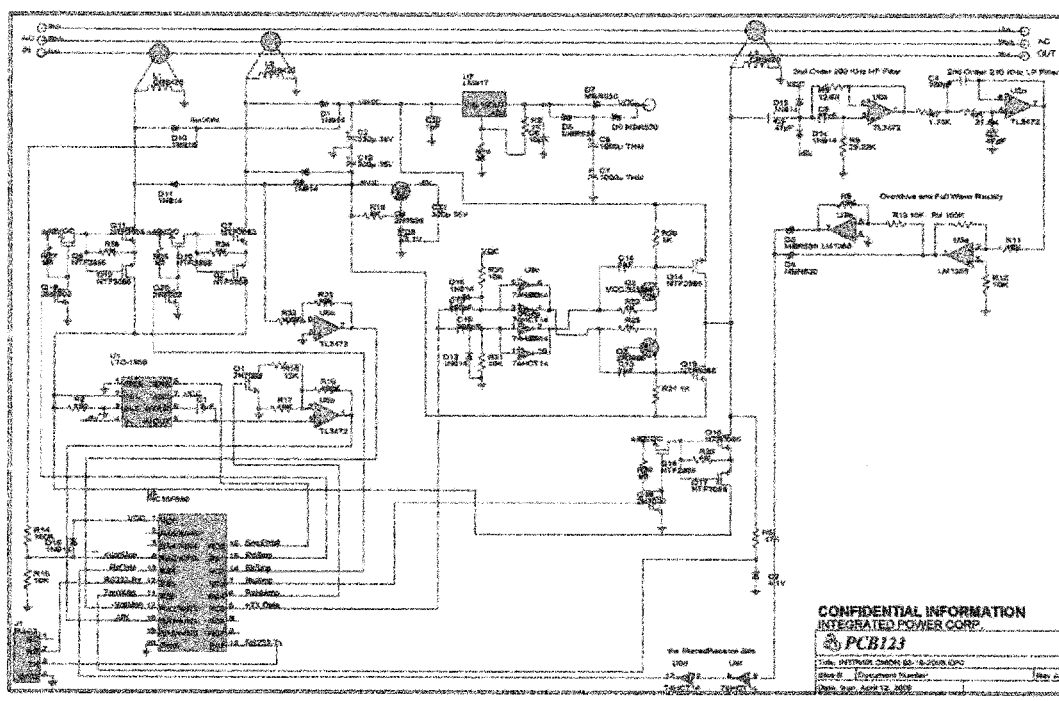
Figure 10: The PeakPower Commander Board Schematic

1100. Relay Case
1110. Relay Contact Pins
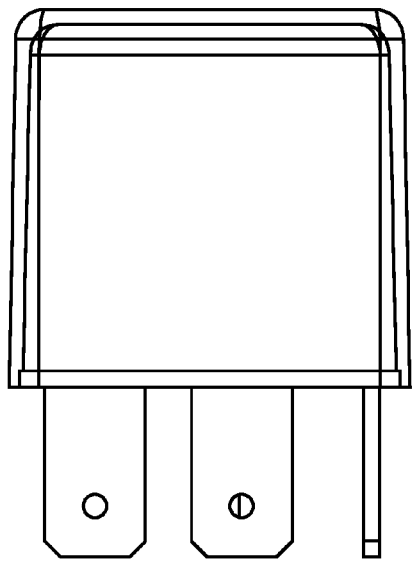
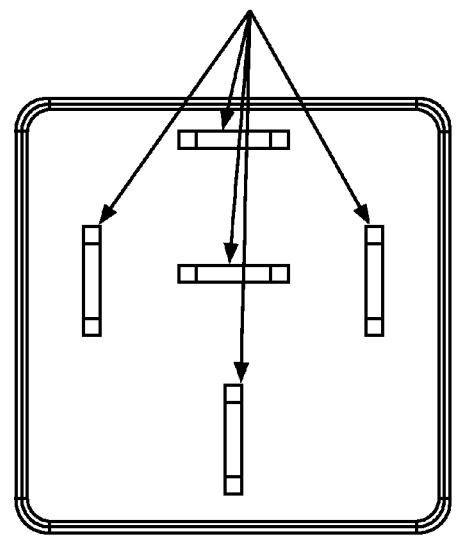
Figure 11: Multi-Stable Relay Mechanical Drawings

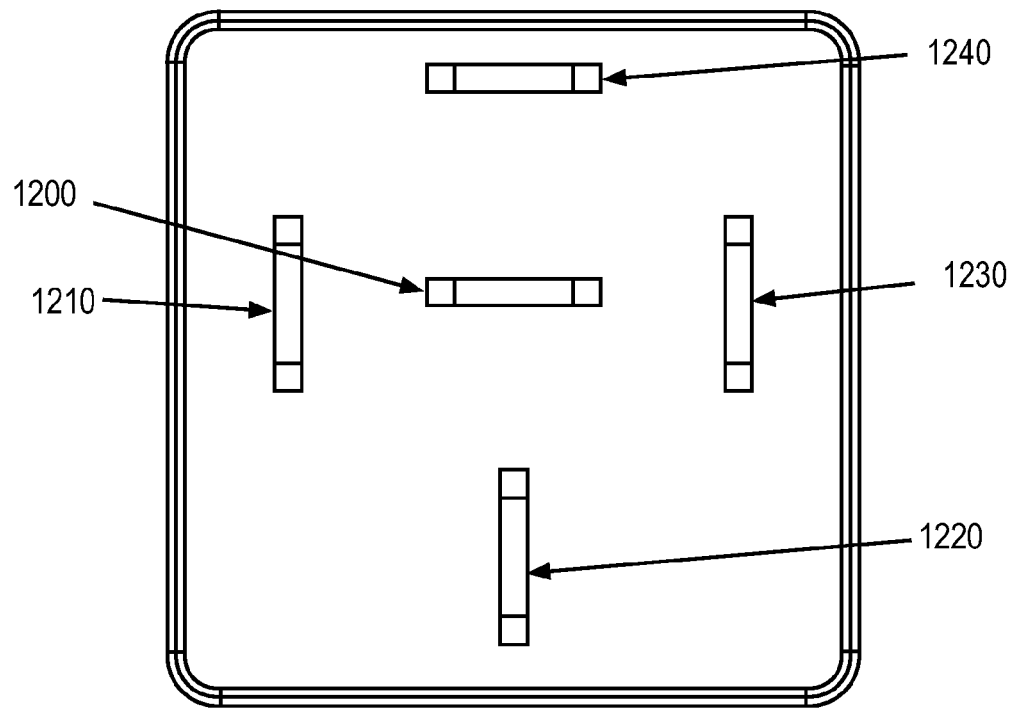
Figure 12: Multi-Stable Relay bottom view

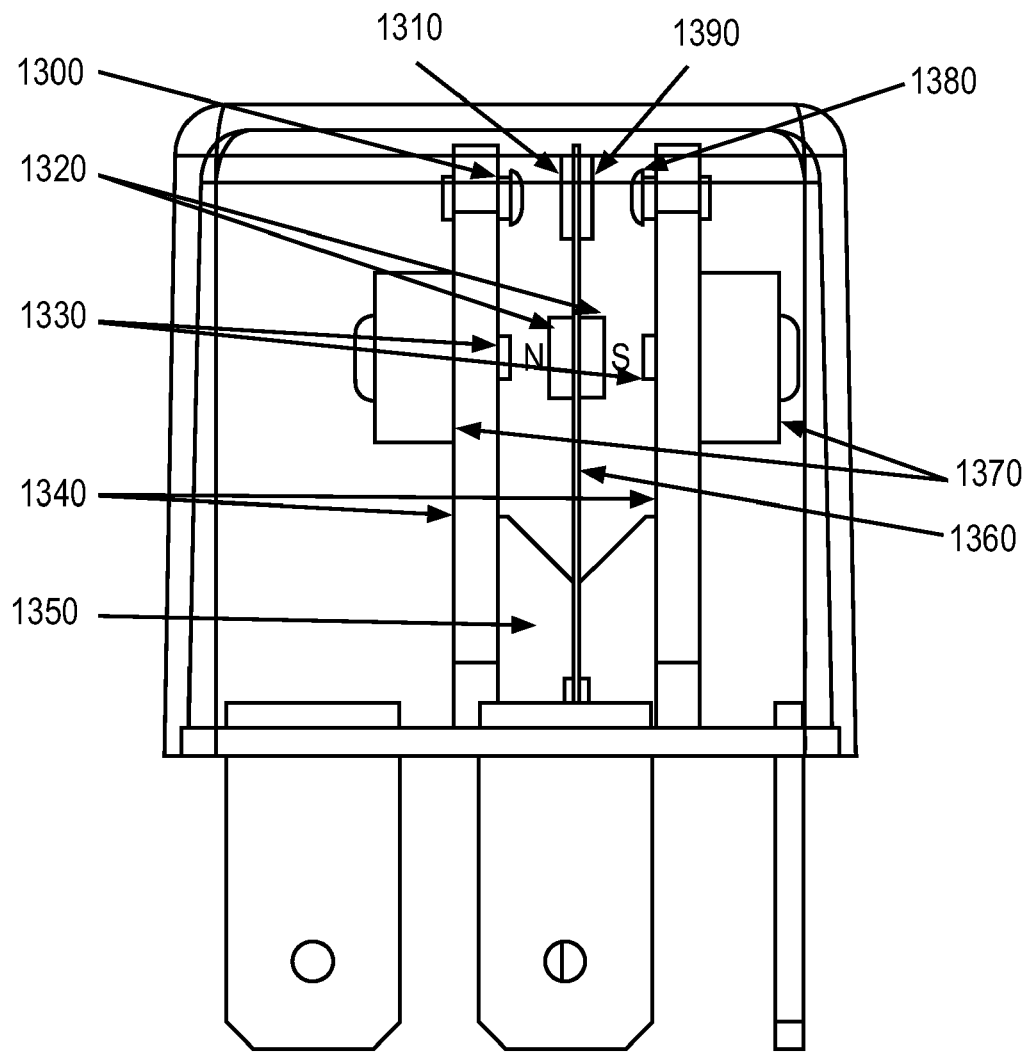
Figure 13: Multi-Stable Relay top view

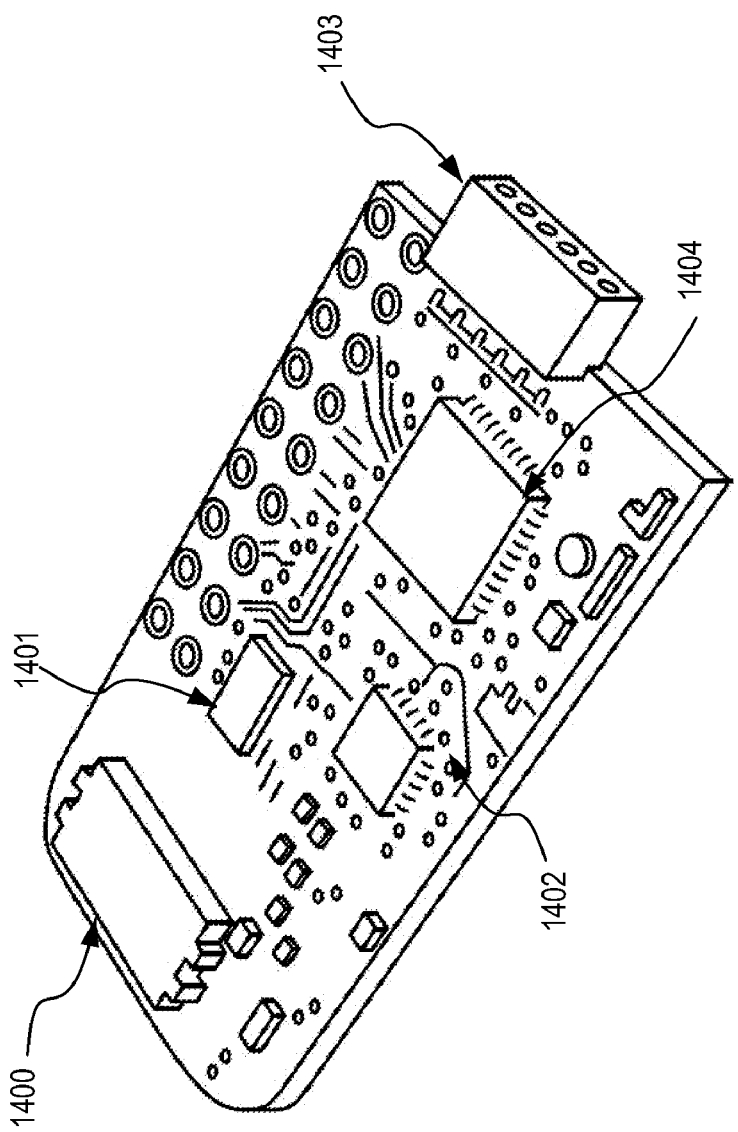
FIG. 14: RF Module

US 8,396,678 B2

PEAKPOWER ENERGY MANAGEMENT AND CONTROL SYSTEM METHOD AND APPARATUS

CROSS-REFERENCE TO RELATED APPLICATIONS

This application claims priority from U.S. Provisional Patent Application 61/087,963, filed Aug. 11, 2008 and U.S. Provisional Application No. 61/142,838, titled "Sidecar for Peak Power System" filed on Jan. 6, 2009, both entire disclosures of which are hereby incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

Embodiments of the present invention relate generally to Energy Management and Control Systems (EMCS).

2. Description of the Related Art

Conventional Energy Management and Control Systems are not totally integrated into the fabric of the control panels and wiring at the circuit level. Many times, clamp-on CT's are brought into a facility and the circuits are monitored for a few days to characterize typical energy usage, then all the equipment and instrumentation is removed before the "Fire Marshal" arrives. The conventional methods have such a "rats nest" of wiring and instrumentation hanging out of the panels that it would never pass the "Fire Marshal" inspection.

Conventional Energy Management and Control Systems do not do first and second derivatives and utilize historical graphs and graphs of similar equipment to anticipate equipment abnormalities and potential failures.

Conventional Energy Management and Control Systems are largely localized at a specific location. There is no means for comparing the energy consumption patterns of a piece of equipment at one location to the same or similar type of equipment at another location.

Conventional Energy Management and Control Systems relays require continuous energy to hold them in certain positions. A Normally Open (NO) relay requires continuous energy to keep it closed. A Normally Closed (NC) relay requires continuous energy to keep it open.

There is a need for a relay that doesn't waste energy that will hold in any position without consuming outside energy. The instant invention accomplishes all these goals.

BRIEF SUMMARY OF THE INVENTION

It is an object of the present invention to provide a highly integrated, innocuous (almost invisible) energy management and control system hardware and software, which operates continuously 24/7/365 and may be monitored and controlled over the Internet from virtually anywhere in the world. It silently monitors and alerts humans only when there's a problem that it can't handle.

Another object of the present invention is to provide virtually continuous, monitoring and analysis of energy consuming equipment and detecting early warning signs of increasing energy use or potential failure.

Another object of the present invention is to be able to actively remotely control energy usage and thermostats via the internet, (e.g. in case someone leaves an Air Conditoner on after hours).

BRIEF DESCRIPTION OF THE DRAWINGS

The present invention may be better understood, and its numerous objects, features, and advantages made apparent to those skilled in the art by referencing the accompanying drawings.

FIGS. 1a and 2b depict a prior art image of an existing three phase circuit breaker, specifically in which FIG. 1a is a Prior Art Circuit Breaker as front view 100 and further in which FIG. 1b is a Prior Art LFD Current Limiter 110.

FIG. 2: The PeakPower System Components illustrates the components of the system including the PeakPower Central Server, PeakPower Gateway Cellular WAN Module, Peak-Power Commander Device, Temperature- Pressure- Humidity Sensor, Gas Sensor, Liquid Sensor, Wireless Thermostat, Operational Software and various user terminals (Laptop, tablet, Cell Phone, etc.) depicted at the various elements 200 PeakPower commander in a clear enclosure, 210 standard off the shelf 3-phase breaker, 220 PeakPower Gateway cellular WAN module, 230 PeakPower main server, 240 PeakPower software, 250 computers, PDAs, cell phones, tablets for monitoring local or remote in which colors indicate level of alert, 260 sensor for gas usage sends data to gateway wired or wireless, uses battery or AC power, 270 sensor for water usage, sends data to gateway wired or wireless, uses battery or AC power, 280 Sensor for temperature, humidity and pressure, sends data to gateway wired or wireless, uses battery or AC power, and 290 wireless thermostat receives commands and sends status via gateway over Internet to server, uses battery or AC power.

FIG. 3: PeakPower Commander in Clear Case Installed beside Circuit Breaker, shows how the PeakPower Commander Sensor and communications unit mounts next to an existing Circuit Breaker as depicted at the various elements 300 PeakPower, 310 Three Phase Power wires go straight through insulation and all in which contact is not required, 320 Three CTs one for each phase: Black, Blue, and Red, 330 Electrolytic capacitors mounted on PCB, and 340 showing screws for securing each power wire once they are routed through.

FIG. 4: Photograph, PeakPower Commander Front View, shows the components and CT's on the front of the Peak-Power Commander unit as depicted at elements 400 depicting Current Transformers (CTs).

FIG. 9: Voltage versus Current Zero Crossings at element 900 depicting Zero crossing for Voltage and Current that are 180 degrees out of phase, showing how the PeakPower commander communicates near zero crossings using the CT that it measures current with.

FIG. 10: The PeakPower Commander Board Schematic, illustrating one of the preferred embodiments.

FIG. 11 is a mechanical drawing of the preferred embodiment #2 of the Multi-Stable Relay according to the present invention.

FIG. 12 is a bottom view of the preferred embodiment #2 of the Multi-Stable Relay FIG. 13 is a side view of the preferred embodiment #2 of the Multi-Stable Relay FIG. 14 is a photograph of the sub-GigaHertz wireless module used for local communications between Gateway and Sensors.

DETAILED DESCRIPTION OF THE INVENTION

The following sets forth a detailed description of a mode for carrying out the invention. The description is intended to be illustrative of the invention and should not be taken to be limiting.

Figure 15:
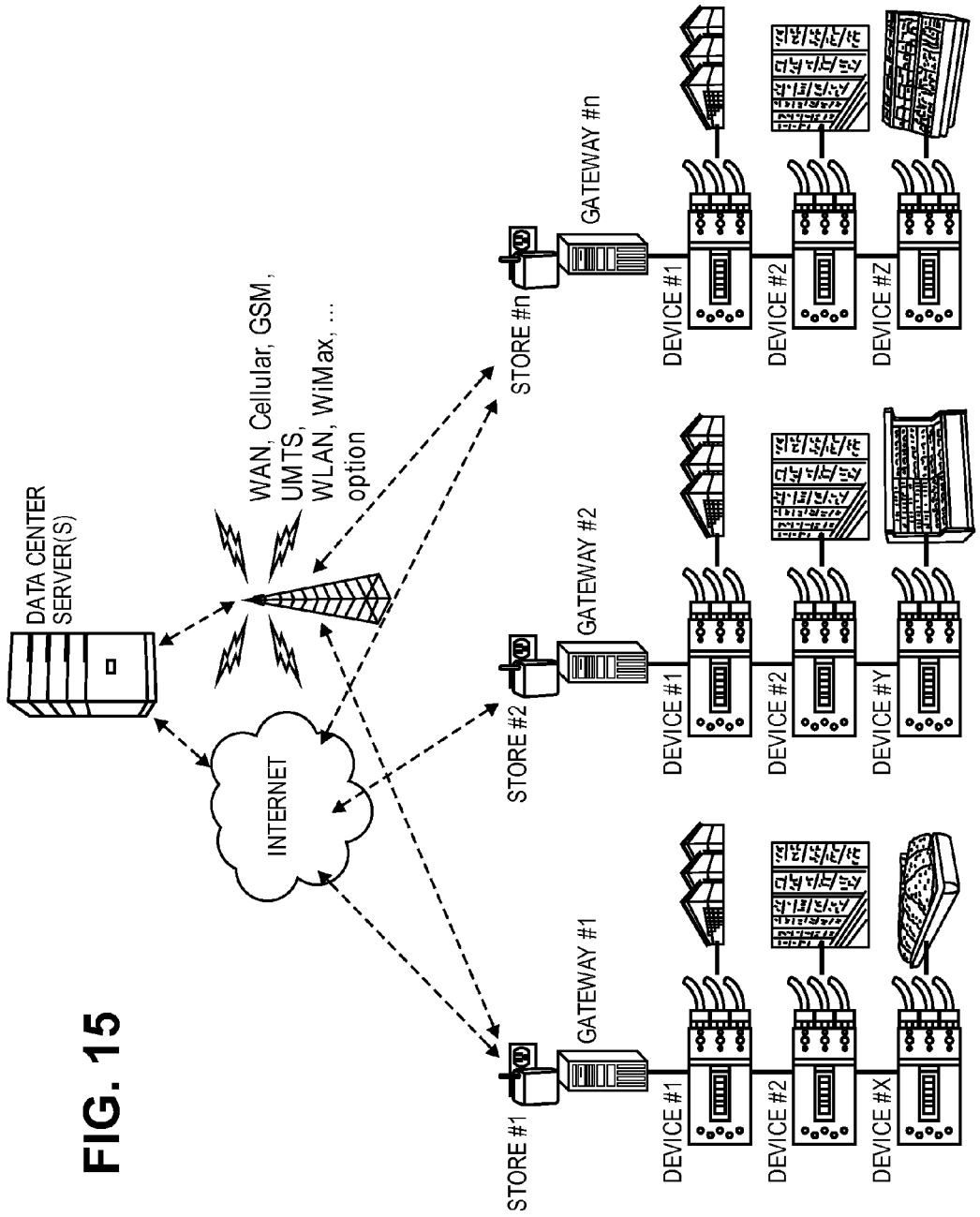
FIG. 15 is the "PeakPower System—Power Monitoring Architecture". This is a high level diagram that doesn't include the entire host of monitoring devices (e.g. Temperature, Pressure, Humidity, Gas Flow, Liquid Flow, Thermostats etc.) This is just to give a high level communications overview to show how some of the key pieces of the system fit together and communicate in a power monitoring application.

The PeakPower Management and Control System is organized as a hierarchical system (see FIG. 15). It is comprised of a Central Server at the top which manages and controls several Gateways at several different locations.

FIG. 15 illustrates a basic PeakPower System for a Power Monitoring application. This is a high level diagram of the key pieces for Power Monitoring. This includes a Gateway device at each location to gather and manage the data at that site and forward that data up to the main server(s) for further processing, analysis and closed loop control. This diagram doesn't include the entire host of monitoring devices (e.g. Temperature, Pressure, Humidity, Gas Flow, Liquid Flow, Thermostats etc.). Please refer to FIG. 2 for details. This is just a high level communications architecture overview to show how some of the key pieces of the system fit together and communicate in a power monitoring application.
Note that equipment power usage characteristics anf curves on a piece of equipment in Location 1 may be analyzed and correlated with the patterns observed on the same type equipment in Location 2 or Location n and adjusted for environmental conditions, to determine if it's outside a preset "corridor" of operation. If so, an ALERT or an ALARM will be set dependent on how far outside limits it is or how rapidly (derivative) it's proceeding to go out of limits.

FIG. 2 is a system block diagram of the PeakPower Management and Control Apparatus that includes sensors, relays, acquisition, processing and analysis software and operational user interface. The sensors monitor power in the power lines, they also derive all the power required to drive the monitor module apparatus from the power lines they are monitoring. Said modules also communicate over said power lines all without making physical contact with said power lines.

The Power Management and Control Software [240] performs statistical analysis on all signals including first and second derivatives and compares it to data acquired on previous dates and times as well as comparing it to manufacturers specs as well as data from the same model of equipment in other locations to detect early warning signs of potential failures or anomalies in the power used by this equipment versus other same or similar equipment in order to optimize energy use.

The Power Management and Control User Interface shown replicated on the Computer, Cell Phone and PDA in [250] uses a priority pop-up scheme to pop-up the most critical alert or alarm item out of the group currently being monitored to bring instant attention to it (Border colored Red is a Critical ALARM) (Border colored Yellow is a warning ALERT) (Border colored Green means it's within limits), and give the operator timely data to make critical decisions instantly. There is a set of Red, Yellow, Green indicators (like idiot lights) across the top (or bottom) of the screen where the overall status of all entities being monitors is viewable at a glance. The Red once always pop to the upper left corner and sound the buzzer.

If multiple ALARMS occur they propagate to the right upper corner then the lower left corner then finally the lower right corner if four alarms occur before they can be corrected and return to green status. After the screen is full, the idiot lights at the top are used to manage further red and yellow ALARMS and ALERTS. As the ALARMS or ALERTS are corrected, they return to GREEN.

Embodiments of the present disclosure describe a PeakPower System, which includes the Peak Power Commander Sensor Module. The Peak Power System provides local and/or remote control of various aspects of device operation (e.g., power, security, etc.) for commercial, industrial and/or residential applications. In some embodiments, the Peak Power System may monitor temperature and reset a thermostat, turn on/off an air conditioning or refrigeration unit, etc.

The Peak Power System is described in detail in U.S. Provisional Application No. 61/087,963, titled "Peak Power System" filed on Aug. 11, 2008, the entire disclosure of which is hereby incorporated by reference.

A Sidecar embodiment of the "Peak Power System" is described in detail in U.S. Provisional Application No. 61/142,838, titled "Sidecar for Peak Power System" filed on Jan. 6, 2009, the entire disclosure of which is hereby incorporated by reference. The "Sidecar" has since been renamed, "PeakPwr Commander", hereinafter referred to as "PeakPower CMDR".

The present disclosure implements the Peak Power System's energy sensor through a PeakPower CMDR device that may be coupled, e.g., installed, beside a conventional circuit breaker such as, but not limited to, an Eaton (Cutler-Hammer) ED and FD type of circuit breaker, see, e.g., FIG. 1a. In other embodiments, the PeakPower CMDR may be configured to couple with other circuit breakers. The PeakPower CMDR is a somewhat similar form factor to the LFD Current Limiter shown in FIG. 1b. Although, the PeakPower CMDR makes no physical connection to any of the wires, except the wires pass directly through the hole(s) in the PeakPower CMDR (insulation and all in some cases) with no screws required, because the wire is not physically attached to the PeakPower CMDR.

Figure 6:
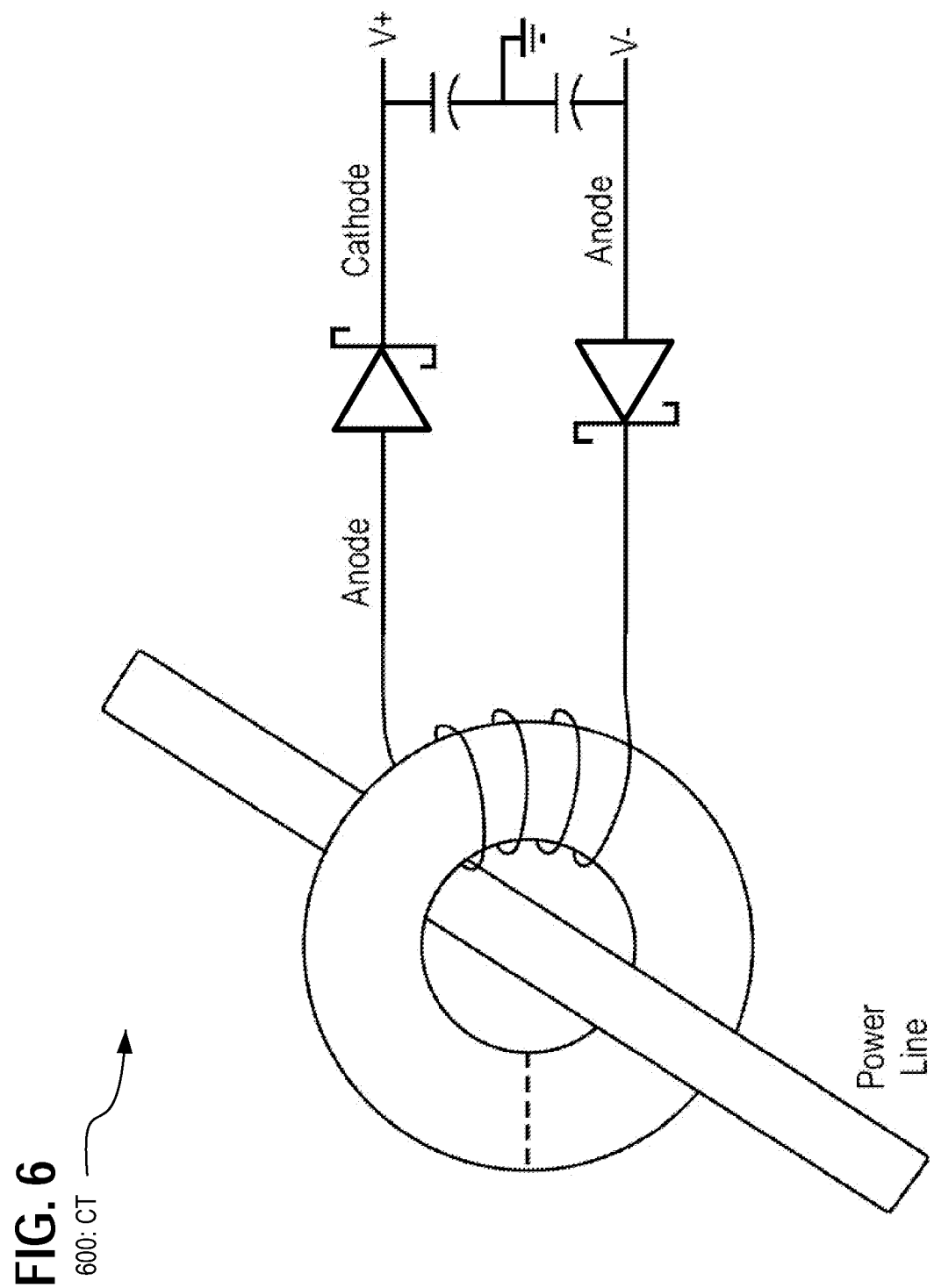
FIG. 6: The CT used to extract power during the intervals when it's not measuring, so that it supplies power to the PeakPower Commander Device.

The PeakPower CMDR may have three phases and the board mounts in the case so that the wires go straight through the three current sensors and out the other side. There is no physical electrical connection or physical connection required. The sensing and communications are all done via current Transformers (CT's). Even the power to drive the PeakPower CMDR is extracted through these CT's. For instance, FIG. 6 depicts element 600, in which the CT is alternately switched (Using very low $R_{DS}$ ON FET's) to build up power to power the PeakPower Commander Module using Low $V_f$ Schottky diodes and further in which The CT supplies power to the PeakPower Commander Device.

The PeakPower CMDR may communicate through the wires it's monitoring or it may communicate through the Sub-GigaHertz wireless module that plugs onto the tear of the main board. Refer to FIG. 14 in which an RF Module (433 MHz or 900 MHz) is depicted having thereupon elements 1400 of a chip antenna, 1401 of a crystal oscillator, 1402 of a CC 1101 Transceiver, 1403 of a connector to connect to a main board or to a battery, and element 1404 of an MSP430 processor with a temperature sensor. Note, this module has a space to plug in the temperature and humidity sensors so that the same module can be used as the Temperature/Pressure/Humidity sensor, simply by connecting a battery to it and placing it in a separate enclosure.

The pressure sensor is a Pegasus MPL115A MEMS type sensor (very tiny).

Referring to FIG. 3, in this embodiment, there are three current transducers (CT) mounted on the Printed Circuit Board (PCB) in a row. The three Wires are momentarily disconnected from the breaker, then routed through the three CT's and back into the Breaker like they normally go, and the screws in the Breaker are used to secure the Wires as usual.

FIGS. 3 and 4 show perspective views of a circuit breaker with the PeakPower CMDR coupled thereto in accordance with some embodiments. The housing of the PeakPower CMDR is shown as semitransparent in FIG. 3 and is not shown in FIG. 4.

One key element of the PeakPower CMDR is the communications methodology. The PeakPower CMDR utilizes the Current Transformer(s) [CT] for communications, obviating the need for physically connecting to the wire(s)

A key novelty of this technique is that the current and voltage on the Wire(s) is 90 degrees out of phase. See FIG. 9 for an illustration of this relationship. In prior art techniques (e.g. X-10) the communications must occur at or near the Voltage zero crossing when the voltage in the line is at a low ebb. The PeakPower CMDR, however, is more flexible. Since it utilizes a "Current" Transformer to communicate, it can also transmit and receive when the Line Voltage is at or near its MAXIMUM, because that's when the Current is near zero. The PeakPower CMDR typically sends or receives high frequency pulses during a preset narrow window of time relative to a cycle (typically 50 Hz or 60 Hz). Also, the position of the pulse(s) within this window may be further interpreted to yield even more data bits per cycle.

Figure 5:
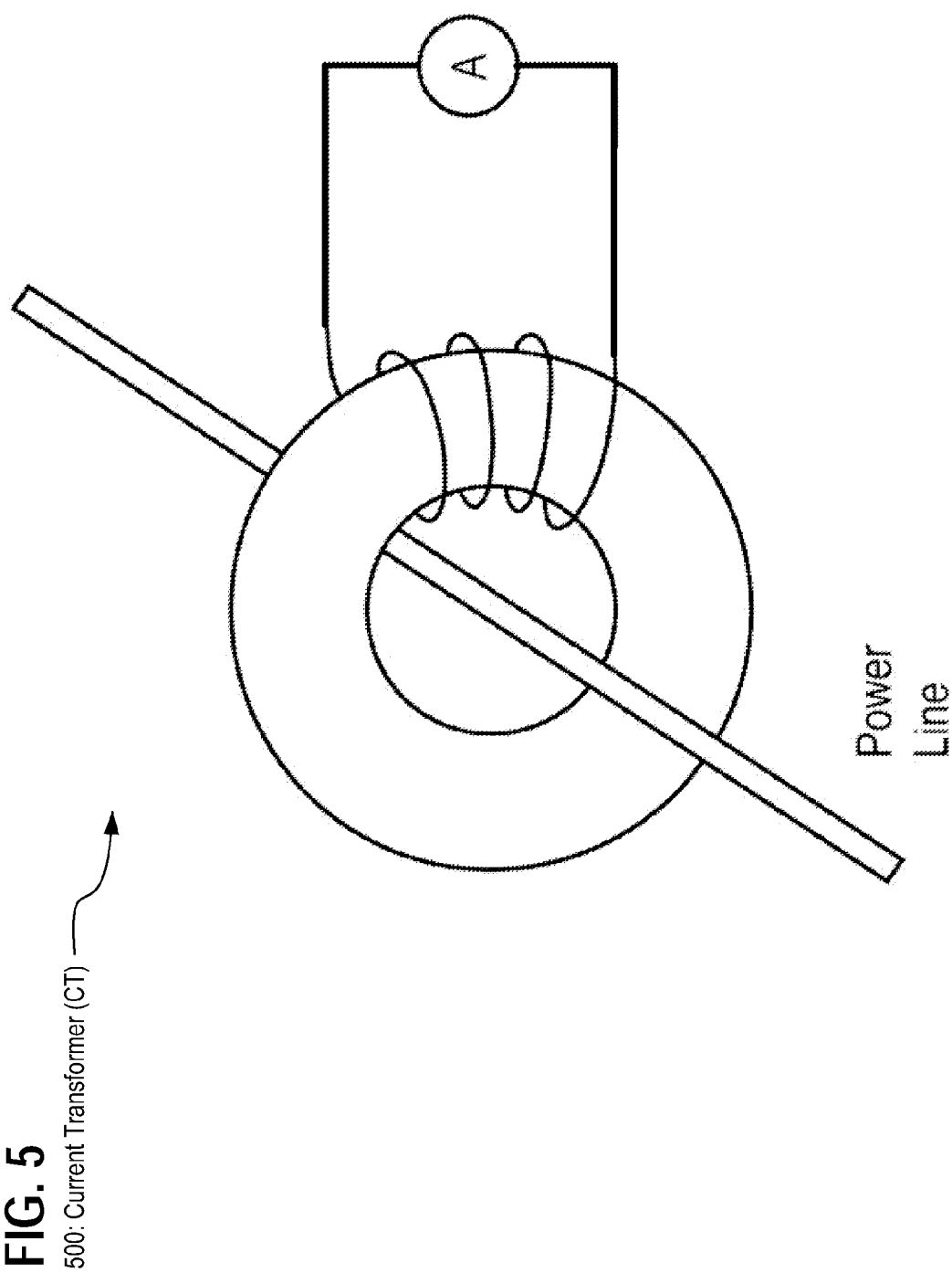
FIG. 5: The Current Transformer (CT) used as a standard current measuring device

The liquid and gas flowmeters in the preferred embodiment (FIG. 2) may use similar Doppler technology, or Magnetic-Inductive or Coriolis type sensor pickups. The small wall-wart attached to it contains the sub GigaHertz wireless module or it can optionally communicate via Power Line Controller (PLC). For instance, FIG. 5 depicts element 500, in which the Current Transformer (CT) measures current via the magnetic field generated when the current passes through it, and further in which the Current Transformer (CT) is used as a current measuring device.

FIG. 10 illustrates a circuit schematic of the PeakPower CMDR as set forth at element PCB 123 of FIG. 10 depicting the PeakPower Commander Board Schematic, in accordance with some embodiments. This shows how the two CT's on the left (L1 and L2) are full wave rectified (when they are not being sampled) in order to extract power to power the device. They normally sample once every 15 to 30 seconds for only a few milliseconds.

The instant invention solves the problems of prior art relays too. The Multi-Stable Relay consumes much less (near zero) energy. The only energy required is a minimal amount of energy (a pulse) to change the relay from one state to another.

The Power Management and Control relays in FIGS. 11, 12 and 13 are novel requiring zero electrical energy to remain enabled or disabled, referred to as a Permanent Magnet Multi-pole, Multi-Throw Relay that has a magnetic detent at every throw position requiring no electrical energy to be applied to keep it closed or open as the case may be.

Figure 7:
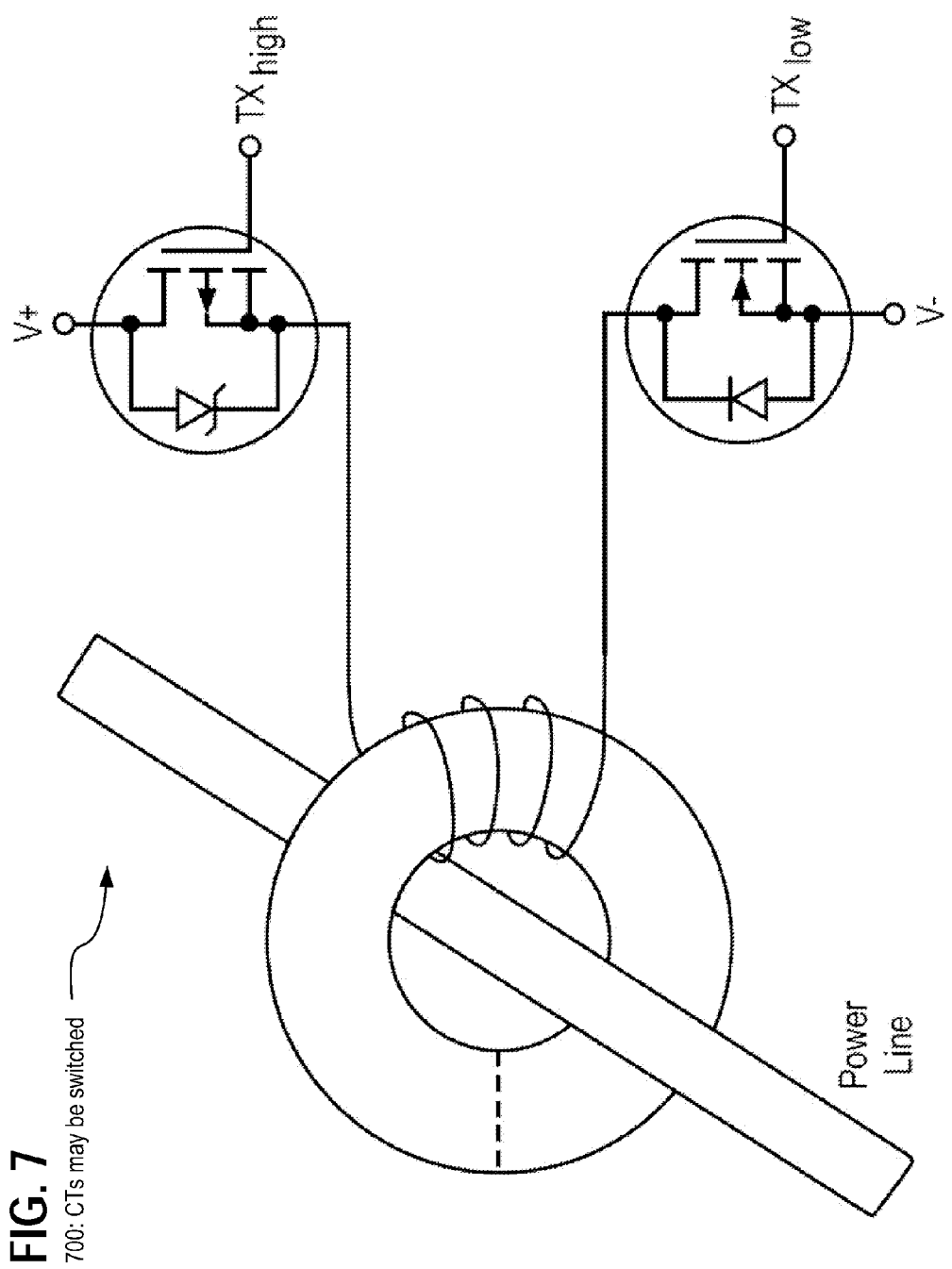
FIG. 7: One or more of the CT's may be used for communications over the power line(s), This figure illustrates the Transmit mode.

This "Control" portion of this PEAKPOWER ENERGY MANAGEMENT AND CONTROL SYSTEM is referred to as a Multi-Stable Magnetic Relay Multi-stable relay method and apparatus for switching electrical power with zero holding current, For instance, FIG. 7 depicts element 700, in which one or more of the CTs may be switched (e.g., using very low $R_{DS}$ ON FETs) to use it as a communications device for transmitting and receiving. FIG. 7 thus depicts one implementation for the transmit side of the PeakPower Commander Board. According to FIG. 7, one or more of the CTs may be used for communications over the power line(s) in transmit mode.

Figure 8:
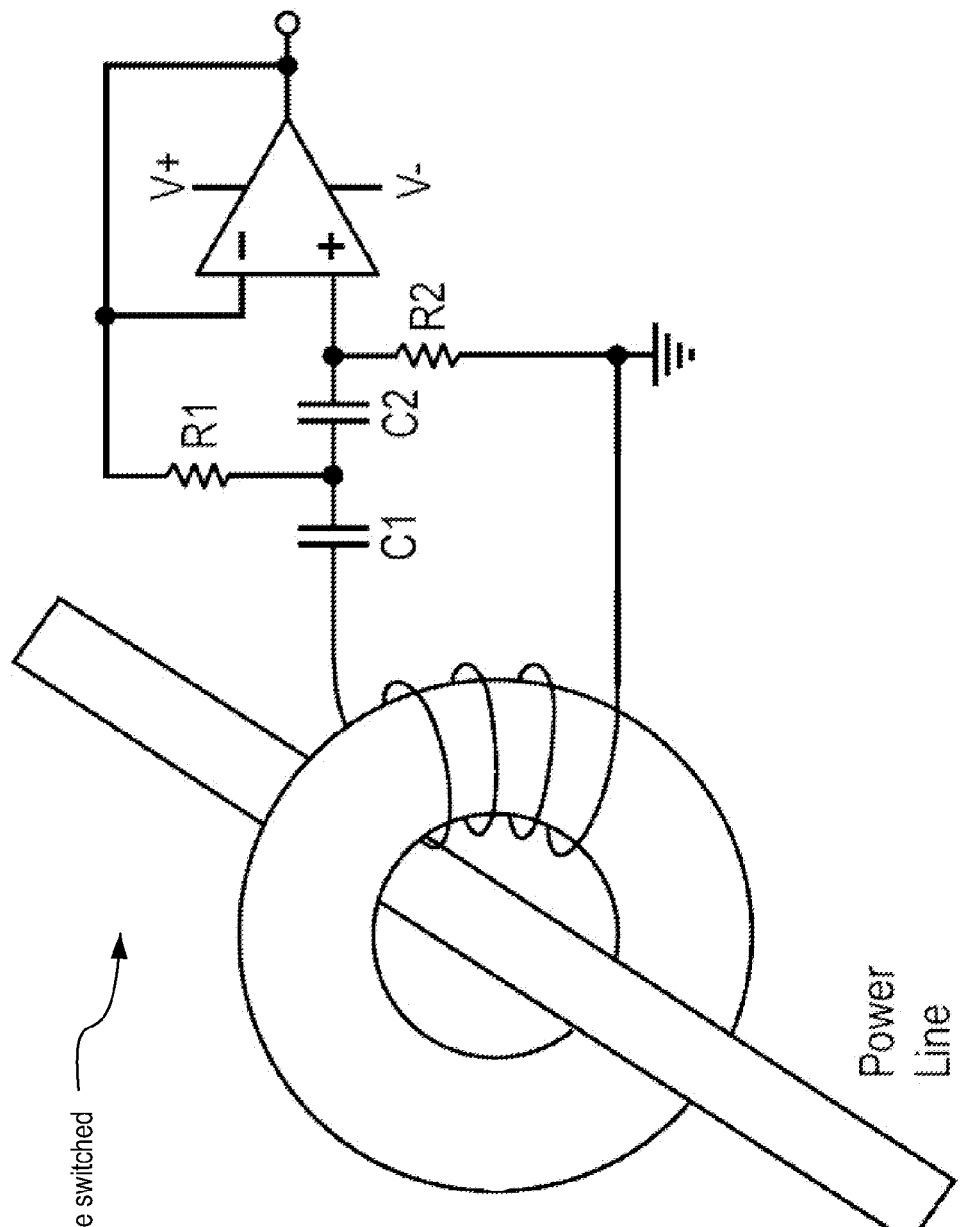
FIG. 8: One or more of the CT's may be used for communications over the power line(s), figure illustrates the Receive mode.

This method and apparatus for switching power, requires no activation or hold current once it's switched to any state. Any detent state is held by permanent magnet force and requires zero current to hold the relay in any detent state position. For instance, FIG. 8 depicts element 800, in which one or more of the CTs may be switched (e.g., using very low $R_{DS}$ ON FETs) to use it as a communications device for transmitting and receiving. FIG. 8 thus depicts one implementation for the receive side of the PeakPower Commander Board. According to FIG. 8, one or more of the CTs may be used for communications over the power line(s) in receive mode.

The Relay Preferred Embodiment #1 is as disclosed in the Provisional Application Ser. No. 61/087,963 filed Aug. 11, 2008 which is included in its entirety by reference Preferred embodiment #2: This preferred embodiment is a simple form, a Single Pole Double Throw (SPDT) version in FIG. 11

The enclosure case [1100] is plastic and could be polycarbonate, ABS, acrylic, etc. There are five connector pins [1110] in this embodiment which make electrical contact to the Printed Circuit Board (PCB) usually via a connector socket that is soldered down onto the PCB when it's manufactured.

FIG. 12 is a bottom view of the Multi-Stable Relay showing the five connector pins. These pins are typically fairly large in order to minimize losses when high currents are passing through. The Main Voltage/Current Input/Output Pin [1200] is where the main input current/voltage or output current/voltage either enters or exits. It's bi-directional.

The Voltage/Current Input/Output Pin-1 [1210] is where one input current/voltage or one output current/voltage either enters or exits. This pin is also referred to as NOC-1 which means "Normally Open or Closed". This is to distinguish it from prior art which is either NO or NC. This pin is also bi-directional.

The Voltage/Current Input/Output Pin-2 [1230] is where a second input current/voltage or one output current/voltage either enters or exits. This pin is also referred to as NOC-2. This pin is also bi-directional.

The Control Pins, Control Pulse-1 [1220] and Control Pulse-2 [1240] are where the activation switching signal is applied.

When [1240] is held at Ground potential and a 20 msec 12 Volt pulse is applied to [1220] the Relay goes to STATE 1 where MAIN [1200] is connected to [1210]. And it stays in that state consuming no detention until an opposite polarity pulse is received.

i.e. When [1220] is held at Ground potential and a 20 msec 12 Volt pulse is applied to [240] the Relay goes to STATE 2 where MAIN [1200] is connected to [1230].

And it stays in that state consuming no detention power until an opposite polarity pulse is received.

In FIG. 3 In order to move the torsion beam conductor [1370] over to the left side and activate current flow between pins [1200] and [1210], the control pin [1220] is momentarily switched to Ground and a 12 VDC pulse is applied to pin [1240] for 20 msec. The pulse goes through both inductor coils.

The momentary magnetic field generated in the two coils pushes the magnet(s) to the left. Actually the Left Coil [element 1370 on the Left] attracts the North pole of the magnet(s) and [element 1370 on the Right] repels the South pole so that the magnet "sticks" to the left ferromagnetic screw, causing the osculating contact [1310] to make solid contact with [1300], the Voltage/Current Input/Output Pin-1 Static Contact and current flows with no further activation or detent current required. Elements 1310 Voltage/Current input/output NOC-1 Osculating contact, 1320 Reciprocating Magnet(s) Left and Right, 1330 screw or rivet made of slightly ferrous material detent to attract and hold reciprocating magnet(s) left and right, 1340 planar support bar, left and right, 1350 left to right support stiffener, 1360 Torsion beam electrical conductor main voltage/current input/output, 1380 voltage/current input/output-2 NOC-2 static contact, and 1390 voltage/current input/output-2 NOC-2 osculating contact are further depicted.

In order to flip the Relay to Position 2 on the right simply reverse the process by momentarily holding pin [1240] to Ground and applying a 12 VDC pulse for 20 msec to pin [1220].

An alternative method for flipping the relay is to tie one of the Control pins to ground either [1220] or [1240] and pulse the other pin with +12 VDC then −12 VDC alternately to flip it back and forth.

This Multi-Stable Relay [FIGS. 11,12,13] is one of the key elements in providing Control in this EMC System. They are normally equipped with a sub-GigaHertz wireless unit so that the Gateway [220] can turn them on and off based on normal preset cycles or problem conditions or due to commands received over the Internet.

In FIG. 2, [1290] is the Wireless Thermostat which is another one of the key control elements of this Energy Management and Control System. This Thermostat contains a sub-GigaHertz wireless Tx/Rx radio and is controlled directly through the wireless radio in the Gateway Module [220]. The Gateway Module [220] is connected to the Peak-Power Server [230] via the Internet (lightning bolts) either wired or wirelessly via Cellular wireless (e.g. 3 G) radio. So the end user or Energy Management person is able to change the thermostat from virtually anywhere in the world!

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A system comprising:
a first sensor for detecting three phase energy usage data of first commercial or industrial equipment at a first location, wherein the first commercial or industrial equipment at the first location utilizes three phase power;
a second sensor for detecting three phase energy usage data of second commercial or industrial equipment at a second location wherein the second commercial or industrial equipment at the second location utilizes three phase power;
a means for collecting the three phase energy usage data of the second commercial or industrial equipment detected by the second sensor;
a means for determining that the three phase energy usage data of the first commercial or industrial equipment is outside a specified range of values or predicting the three phase energy usage data of the first commercial or industrial equipment will go outside the specified range of values based at least upon a signature of the first commercial or industrial equipment, the signature characterized by at least a sinus rhythm for the first commercial or industrial equipment, and wherein the specified range of values is determined based on the collected three phase energy usage data of the second commercial or industrial equipment at the second location; and
a means for setting an alert responsive to determining the three phase energy usage data of the first commercial or industrial equipment is outside the specified range of values or predicting the three phase energy usage data of the first commercial or industrial equipment will go outside the specified range of values.

2. The system of claim 1, further comprising:
a means to remotely update firmware in the first sensor and the second sensor via the Internet directly or through a local gateway device.

3. The system of claim 1, further comprising:
an additional sensor for detecting operating characteristic data of the first commercial or industrial equipment at the first location, the operating characteristic selected from one of: temperature, humidity, pressure, gas flow, or liquid flow;
an additional sensor for detecting operating characteristic data of the second commercial or industrial equipment at the second location;
a means for collecting the operating characteristic data detected by the additional sensor for the second commercial or industrial equipment;
a means for determining the operating characteristic data of the first commercial or industrial equipment is outside a second specified range of values or predicting the operating characteristic data of the first commercial or industrial equipment will go outside the second specified range of values, wherein the second specified range of values is determined based on the operating characteristic data collected for the second commercial or industrial equipment; and
a means for setting an alert responsive to determining the operating characteristic data of the first commercial or industrial equipment is outside the second specified range of values or predicting the operating characteristic data of the first commercial or industrial equipment will go outside the second specified range of values.

4. The system of claim 1, further comprising:
a server for:
collecting the three phase energy usage data of the second commercial or industrial equipment detected by the second sensor;
determining the specified range of values based on the collected three phase energy usage data of the second commercial or industrial equipment;
determining the three phase energy usage data of the first commercial or industrial equipment is outside the specified range of values or predicting the three phase energy usage data of the first commercial or industrial equipment will go outside the specified range of values; and setting the alert responsive to determining the three phase energy usage data of the first commercial or industrial equipment is outside the specified range of values or predicting the three phase energy usage data of the first commercial or industrial equipment will go outside the specified range of values.

5. The system of claim 1, further comprising:

a first local gateway device for collecting the three phase energy usage data of the first commercial or industrial equipment;

a second local gateway device for collecting the three phase energy usage data of the second commercial or industrial equipment; and a server for receiving the collected three phase energy usage data of the first commercial or industrial equipment from the first local gateway device and the collected three phase energy usage data of the second commercial or industrial equipment from the second local gateway device, and for determining the three phase energy usage data of the first commercial or industrial equipment is outside the specified range of values or predicting the three phase energy usage data of the first commercial or industrial equipment will go outside the specified range of values.

6. The system of claim 1, wherein predicting the three phase energy usage data of the first commercial or industrial equipment will go outside the specified range of values comprises:

determining a first derivative and a second derivative of the three phase energy usage data of the first commercial or industrial equipment to determine a rate at which power consumption of the first commercial or industrial equipment is changing; and determining the rate at which the power consumption of the first commercial or industrial equipment is changing exceeds a threshold value.

7. The system of claim 1, wherein the specified range of values is determined based further on historical three phase energy usage data of the second commercial or industrial equipment.

8. The system of claim 1, wherein the specified range of values is determined based further on historical three phase energy usage data of the first commercial or industrial equipment.

9. The system of claim 1, wherein the specified range of values is determined based further on an expected range of operation from a specification for the first commercial or industrial equipment and the second commercial or industrial equipment.

10. A method comprising:

detecting, by a first sensor, three phase energy usage data of first commercial or industrial equipment at a first location, wherein the first commercial or industrial equipment at the first location utilizes three phase power;

detecting, by a second sensor, three phase energy usage data of second commercial or industrial equipment at a second location wherein the second commercial or industrial equipment at the second location utilizes three phase power;

collecting the three phase energy usage data of the second commercial or industrial equipment detected by the second sensor;

determining the three phase energy usage data of the first commercial or industrial equipment is outside a specified range of values or predicting the three phase energy usage data of the first commercial or industrial equipment will go outside the specified range of values based at least upon a signature of the first commercial or industrial equipment, the signature characterized by at least a sinus rhythm for the first commercial or industrial equipment, and wherein the specified range of values is determined based on the collected three phase energy usage data of the second commercial or industrial equipment at the second location; and setting an alert responsive to determining the three phase energy usage data of the first commercial or industrial equipment is outside the specified range of values or predicting the three phase energy usage data of the first commercial or industrial equipment will go outside the specified range of values.

11. The method of claim 10, further comprising:

collecting, by a first local gateway device, the three phase energy usage data of the first commercial or industrial equipment;

collecting, by a second local gateway device, the three phase energy usage data of the second commercial or industrial equipment;

receiving, by a server, the collected three phase energy usage data of the first commercial or industrial equipment from the first local gateway device and the collected three phase energy usage data of the second commercial or industrial equipment from the second local gateway device; and determining, by the server, the three phase energy usage data of the first commercial or industrial equipment is outside the specified range of values or predicting the three phase energy usage data of the first commercial or industrial equipment will go outside the specified range of values.

12. The method of claim 10, wherein predicting the three phase energy usage data of the first commercial or industrial equipment will go outside the specified range of values comprises:

determining a first derivative and a second derivative of the three phase energy usage data of the first commercial or industrial equipment to determine a rate at which power consumption of the first commercial or industrial equipment is changing; and determining that the rate at which power consumption of the first commercial or industrial equipment is changing exceeds a threshold value.

13. The method of claim 10, wherein the specified range of values is determined based further on historical three phase energy usage data of the second commercial or industrial equipment.

14. The method of claim 10, wherein the specified range of values is determined based further on historical three phase energy usage data of the first commercial or industrial equipment.

15. The method of claim 10, wherein the specified range of values is determined based further on an expected range of operation from a specification for the first commercial or industrial equipment and the second commercial or industrial equipment.

16. A non-transitory machine readable storage medium having instructions stored thereon that, when executed by a processor on a machine, cause the machine to perform operations comprising:

detecting three phase energy usage data of first commercial or industrial equipment at a first location, wherein the first commercial or industrial equipment at the first location utilizes three phase power;

detecting three phase energy usage data of second commercial or industrial equipment at a second location wherein the second commercial or industrial equipment at the second location utilizes three phase power;

collecting the three phase energy usage data of the second commercial or industrial equipment detected by the second sensor;

determining the three phase energy usage data of the first commercial or industrial equipment is outside a specified range of values or predicting the three phase energy usage data of the first commercial or industrial equipment will go outside the specified range of values based at least upon a signature of the first commercial or industrial equipment, the signature characterized by at least a sinus rhythm for the first commercial or industrial equipment, and wherein the specified range of values is determined based on the collected three phase energy usage data of the second commercial or industrial equipment at the second location; and setting an alert responsive to determining the three phase energy usage data of the first commercial or industrial equipment is outside the specified range of values or predicting the three phase energy usage data of the first commercial or industrial equipment will go outside the specified range of values.

17. The non-transitory machine readable storage medium of claim 16, wherein predicting the three phase energy usage data of the first commercial or industrial equipment will go outside the specified range of values comprises:

determining a first derivative and a second derivative of the three phase energy usage data of the first commercial or industrial equipment to determine a rate at which power consumption of the first commercial or industrial equipment is changing; and determining that the rate at which the power consumption of the first commercial or industrial equipment is changing exceeds a threshold value.

18. The non-transitory machine readable storage medium of claim 16, wherein the specified range of values is determined based further on historical three phase energy usage data of the second commercial or industrial equipment.

19. The non-transitory machine readable storage medium of claim 16, wherein the specified range of values is determined based further on historical three phase energy usage data of the first commercial or industrial equipment.

20. The non-transitory machine readable storage medium of claim 16, wherein the specified range of values is determined based further on an expected range of operation from a specification for the first commercial or industrial equipment and the second commercial or industrial equipment.

* * * * *